United States Patent [19]
Maruyama et al.

[11] Patent Number: 6,003,076
[45] Date of Patent: Dec. 14, 1999

[54] INFORMATION PROVIDING METHOD AND SYSTEM USING INFORMATION MODIFICATION RULES

[75] Inventors: Mina Maruyama; Kiyoshi Nakabayashi, both of Tokyo, Japan; Yoshimasa Koike, Sunnyvale, Calif.

[73] Assignee: Nippon Telegraph and Telephone Corporation, Tokyo, Japan

[21] Appl. No.: 08/753,727

[22] Filed: Nov. 29, 1996

[30] Foreign Application Priority Data

Nov. 30, 1995 [JP] Japan .................................. 7-313053

[51] Int. Cl.$^6$ .................................................. G06F 17/00
[52] U.S. Cl. .......................................................... 709/223
[58] Field of Search ..................... 395/200.47, 200.54, 395/200.49; 705/14; 709/223, 224, 225, 226

[56] References Cited

U.S. PATENT DOCUMENTS

| | | | |
|---|---|---|---|
| 5,740,549 | 4/1998 | Reilly et al. | 705/14 |
| 5,793,972 | 8/1998 | Shane | 395/200.49 |
| 5,796,952 | 8/1998 | Davis et al. | 395/200.54 |
| 5,805,815 | 9/1998 | Hill | 395/200.48 |
| 5,809,242 | 9/1998 | Shaw et al. | 395/200.47 |

OTHER PUBLICATIONS

M. Maruyama et al., "Hyper–link Architecture for CALAT—An Approach to Implementing Intelligent Navigating Function—", Articles of Special Interest Group of Japanese Society for Artificial Intelligence, pp. 104–111, Dec. 8, 1995.

M. Maruyama et al., "An Approach to Implementing Adaptive Hyermedia for an Intelligent Tutoring System on the World–Wide Web", Proceedings of Ed–Telecom 96, World Conference on Educational Telecommunications, p. 373 Jun. 17, 1996.

*Primary Examiner*—Ellis B. Ramirez
*Attorney, Agent, or Firm*—Finnegan, Henderson, Farabow, Garrett & Dunner, L.L.P.

[57] ABSTRACT

An information providing method and system is provided, in which information suitable for a user can be provided without any change for information stored in information providing servers. The method comprises the steps of: preparing information modification rules in which plural classes indicating characteristics of users are determined; regarding at least one information item, identification information with respect to the information item and a server which stores the information item is assigned to one of the classes; a more suitable information item is determined as a modified information item with respect to the assigned information item, the modified information item being used when the assigned information item is chosen by a user who belongs to the relevant class; and identification information with respect to the modified information item and a server which stores the modified information item are registered; providing an information modifying/providing server which performs information provision control with reference to the modification rules; and in the information modifying/providing server, when a first server provides a first information item to an information terminal and the information terminal request a second information item relating to the first information item, judging whether or not the modified information item with respect to the second information item exists in the information modification rules; if the modified information item does not exist, sending an information request to a server which stores the second information item; if the modified information item exists, sending an information request to a server which stores the modified information item; and providing the sent-back information item to the information terminal.

24 Claims, 17 Drawing Sheets

FIG. 3

| MODIFICATION KEY | SERVER NAME | INFORMATION NAME | MODIFIED SERVER NAME | MODIFIED INFORMATION NAME |
|---|---|---|---|---|
| MIDDLE GRADE | A | f | B | g |
| MIDDLE GRADE | A | c | B | h |
| UPPER GRADE | A | b | A | d |
| . . . | . . . | . . . | . . . | . . . |

FIG. 4A

FORMAT A: INFORMATION TERMINAL NAME (DESTINATION) | SERVER NAME (SOURCE) | PROVIDED DATA | LINK INFORMATION 1 [INFORMATION MODIFYING/PROVIDING SERVER NAME | SERVER NAME | MODIFICATION KEY | INFORMATION NAME | ANCHOR INFORMATION 1 | ANCHOR TERMINATION INDEX] | LINK INFORMATION 2 [PROVIDED DATA | INFORMATION MODIFYING/PROVIDING SERVER NAME | SERVER NAME | MODIFICATION KEY | INFORMATION NAME | ANCHOR INFORMATION 2 | ANCHOR TERMINATION INDEX]

FIG. 4B

FORMAT B: SERVER NAME (DESTINATION) | INFORMATION TERMINAL NAME | MODIFICATION INFORMATION [SERVER NAME | MODIFICATION KEY | INFORMATION NAME]

FIG. 4C

FORMAT C: INFORMATION PROVIDING SERVER NAME | INFORMATION MODIFYING/PROVIDING SERVER NAME | INFORMATION NAME FOR PROVISION REQUEST

FIG. 6

INTERNET INFORMATION

When you <u>first use</u> the Internet...
⌣501

When you <u>have previously used</u> the Internet...
⌣502

When you are familiar with the Internet, and want to <u>review only one point of information</u>...
⌣503

FIG. 11

| MODIFICATION KEY | SERVER NAME | INFORMATION NAME | MODIFIED SERVER NAME | MODIFIED INFORMATION NAME | ANCHOR INFORMATION |
|---|---|---|---|---|---|
| MIDDLE GRADE | A | f | B | g | E-MAIL |
| MIDDLE GRADE | A | c | B | h | SMTP |
| UPPER GRADE | A | b | A | d | ... |
| ... | ... | ... | ... | ... | ... |

FIG. 13

INTERNET INFORMATION

Please input user's name.

Hanako Musashino

FIG. 14

| USER'S NAME | LEARNING LEVEL | HISTORY INFORMATION |
|---|---|---|
| TARO MUSASHINO | MIDDLE GRADE | a:b:c:d:e |
| HANAKO MUSASHINO | BEGINNER'S GRADE | |
| ⋮ | ⋮ | ⋮ |

ND SYSTEM USING INFORMATION
INFORMATION PROVIDING METHOD AND SYSTEM USING INFORMATION MODIFICATION RULES

BACKGROUND OF THE INVENTION

1. Field of the Invention

The present invention relates to information providing methods and systems, particularly to those used in an information providing system consisting of information providing servers for providing information; information terminals for requesting, receiving, and displaying information; and communication means such as a computer network for connecting these servers and terminals, and in which an information terminal requests an information providing server to provide an information item requested by a user, and the information providing server sends back the information item. Specifically, the present invention relates to a system for providing information using the so-called "WWW" (World Wide Web) function of the Internet.

2. Description of the Related Art

FIG. 16 shows an example construction in conventional systems. The system shown in the figure consists of at least one information terminal, here, information terminals 11A, 11B, and 11C; at least one information providing server, here, information servers 13A and 13B; and information storage devices 14A and 14B for storing information provided by the information providing servers. In the information storage devices 14A and 14B, plural information items a; b; c, and d; e; f, and the like are stored.

Hereinbelow, the operations of the conventional system will be explained with reference to the sequence chart shown in FIG. 17. Here, it is assumed that the "user" in the following explanation uses information terminal 11A and the server which responds to an information request from the terminal 11A is 13A.

Step S21: The user chooses information (item) c, which the user would like to get next, based on anchor information included in information displayed on information terminal 11A, by using an input device such as a mouse. Here, "anchor information" is visible information (on the display) which functions as a clue for a user to choose an information item.

Step S22: Information terminal 11A analyzes link information appended to the anchor information, so as to acquire the information c which was chosen by the user. Here, "link information" belongs to the system side, and is invisible information which indicates where the relevant information is stored.

Step S23: Information terminal 11A requests the information providing server to provide information c, based on the analyzed link information.

Step S24: The information providing server 13A receives name (data) "c" of the information requested by information terminal 11A, via computer network 12.

Step S25: The information providing server 13A searches storage device 14A for information c which corresponds to the request, and reads out the information.

Step S26: The information providing server 13A sends information c to information terminal 11A via computer network 12.

Step S27: Information terminal 11A receives the information from the information providing server.

By repeating the above steps, various information items are provided from the information providing server to the information terminal.

The flow in which a user receives information in the case of using such a information providing system will be briefly explained with reference to FIG. 18. FIG. 18 shows a conventional-type transition route with respect to information items which a user can acquire, and reference numeral 31 indicates a screen image displayed on the information terminal, which includes an anchor-displaying part 32 which indicates the existence of anchor information.

Here, it is assumed that information (item) a is now displayed on information terminal 11. Generally, on the screen of the information terminal, underlined anchor information is displayed as shown in FIG. 18, while link information is not displayed. The user can, in the present initial stage, choose information b or d which the user can acquire next, according to the underlined part in information a. If the user choose information b, information terminal 11 analyzes link information appended to the anchor information, and requests an information providing server which stores information b to provide the information. Next, information terminal 11 receives information b, whereby the user enters a new state in which the user can choose information e. By repeating the above operation, the user can successively acquire various information items which relate to a part of information shown on the screen of the terminal, without being aware of which information providing server (which is connected to the terminal via a computer network and the like) stores the chosen information.

Additionally, in the case in which an information provider, who constructs such an information providing system, prepares information, it is possible to efficiently provide an information providing system including a vast amount of information by including information with respect to the information stored by another information providing server into the relevant link information. As described above, such an information providing service has excellent characteristics for expansion of the system. Therefore, many information providing servers which provide information having similar formats exist using the present computer networks.

However, this conventional method also has a problem. When a user starts to acquire information with information (item) a as a starting point, the user can only make the transition to information b or d. However, regarding the user's object of acquiring information, or the user's level of understanding of each information item, it may be preferable to take another transition route to information e by skipping information b, or another transition route to information c before acquiring information d. In such cases, unless the content of information a is changed, an information providing system in which a user can directly make the transition to information e or c cannot be realized. However, generally, only the information provider of the information providing server (13A) which contains the relevant information (a) can perform such a change. Furthermore, even if the content of information a could be changed, There still occurs an problem in that each user cannot have an individual transition route for information acquisition.

For example, if it is assumed that information providing servers 13A and 13B (as shown in FIG. 16) are the "WWW" servers in the Internet, information (items a; b; c, and d; e; f) which can be provided from each server and possible routes for the provision (e.g., from "a" to "b" or "c") are previously determined. Here, when a user as a client requests information a from server 13A, the content of information a is not always suitable for the understanding level of the user. Even if information suitable for this user is information b which is positioned below information a, or is another information existing in another server (13B), such information is not automatically provided to the user. In this case, the user is simply confused after acquiring information which is hard to understand for this user.

SUMMARY OF THE INVENTION

In consideration of the above problem, it is an object of the present invention to provide an information providing method and system in which information suitable for a user can be provided without any change of the information stored in information providing servers.

A specific object of the present invention is to provide an information providing method and system in which even if another information item relating to provided information exists in another server, the information terminal can acquire not only the provided information but also other information relating to the provided information from another server without any special operation at the information terminal side.

Therefore, the present invention provides an information providing method used in a system in which at least one server and at least one information terminal are connected to a network, and when one of the at least one information terminal requests information provision, information is provided from one of the at least one server which stores the information, the information providing method comprising the steps of:

(i) preparing information modification rules in which plural classes indicating characteristics of users are determined; then, regarding at least one information item, identification information with respect to the information item and one of the at least one server which stores the information item is assigned to one of the classes; a more suitable information item is determined as a modified information item with respect to the assigned information item, the modified information item being used when the assigned information item is chosen by a user who belongs to the relevant class; and identification information with respect to the modified information item and one of the at least one server which stores the modified information item are registered;

(ii) providing an information modifying and providing server which performs information provision control with reference to the modification rules; and (iii) in the information modifying and providing server, when a first server of the at least one server provides a first information item to one of the at least one information terminal and the information terminal request a second information item relating to the first information item, judging whether or not the modified information item with respect to the second information item exists in the information modification rules; if the modified information item does not exist, sending an information request to one of the at least one server which stores the second information item to send back the second information item to the information modifying and providing server; if the modified information item exist, sending an information request to one of at least one server which stores the modified information item to send back the modified information item to the information modifying and providing server; and providing the sent-back information item to the information terminal which requested information.

Accordingly, even if a beginner user cannot avoid choosing an information item which appears to be too difficult for the user, it is possible to automatically provide an information item which the user may find easier to understand.

In addition, when the information modifying and providing server provides the information item to the information terminal, (i) link information for establishing a condition in which, when the information terminal next requests information, the request is issued via the information modifying and providing server, or (ii) link information including identification information with respect to the relevant class, may be added to the information item.

In this case, the user can again use information provision from the information modifying and providing server with the assigned class; thus, the same service can continuously be provided for the user.

Furthermore, access history information with respect to information access of the information terminal may be stored, and link information to be appended to the information item which is provided to the information terminal may be generated according to the access history information.

In this case, it is possible to realize a more minute information provision control based on access history information of each user.

The present invention also provides:

(1) a storage medium storing a computer program which making a computer execute the above method, and (2) an information providing system corresponding to the above method.

The information providing system of (2) above, in which at least one server and at least one information terminal are connected to a network, comprises:

(i) memory means for storing information modification rules in which plural classes indicating characteristics of users are determined; then, regarding at least one information item, identification information with respect to the information item and one of the at least one server which stores the information item is assigned to one of the classes; a more suitable information item is determined as a modified information item with respect to the assigned information item, the modified information item being used when the assigned information item is chosen by a user who belongs to the relevant class; and identification information with respect to the modified information item and one of the at least one server which stores the modified information item are registered; and (ii) an information modifying and providing server which performs information provision control with reference to the modification rules stored in the memory means.

The information modifying and providing server comprises:

(i) request receiving means for receiving an information request from one of the at least one information terminal, the request being issued when a first server of the at least one server provides a first information item to the information terminal, and the request having a demand for a second information item relating to the first information item;

(ii) judging means for judging whether or not the modified information item with respect to the second information item exists in the information modification rules;

(iii) information acquiring means for sending an information request to one of the at least one server which stores the second information item to acquire the second information item if the modified information item does not exist, and for sending an information request to one of the at least one server which stores the modified information item to acquire the modified information item if the modified information item exists; and (iv) sending means for providing the information item acquired by the information acquiring means to the information terminal which requested information.

That is, according to the present invention, information more suitable for each user can be provided without any additional operations at the user side, and without any change for the link system (which is fixedly constructed by an information provider) of information stored in the information providing servers.

BRIEF DESCRIPTION OF THE DRAWINGS

FIG. 3 shows an example of the information modification rules used in the system.

FIGS. 4A–4C show examples of the formats of information sent and received between the information terminal, the information providing server, and the information modifying and providing server.

FIG. 6 is a diagram showing an example of the initial screen image displayed on the information terminal.

FIG. 11 shows an example of the information modification rules used in the second embodiment.

FIG. 13 is a diagram showing an example of the initial screen image displayed on the information terminal in the third embodiment.

FIG. 14 shows an example of the history management table used in the third embodiment.

DESCRIPTION OF THE PREFERRED EMBODIMENTS

Hereinbelow, embodiments of the present invention will be explained with reference to the drawings.

First Embodiment

Figure 1:
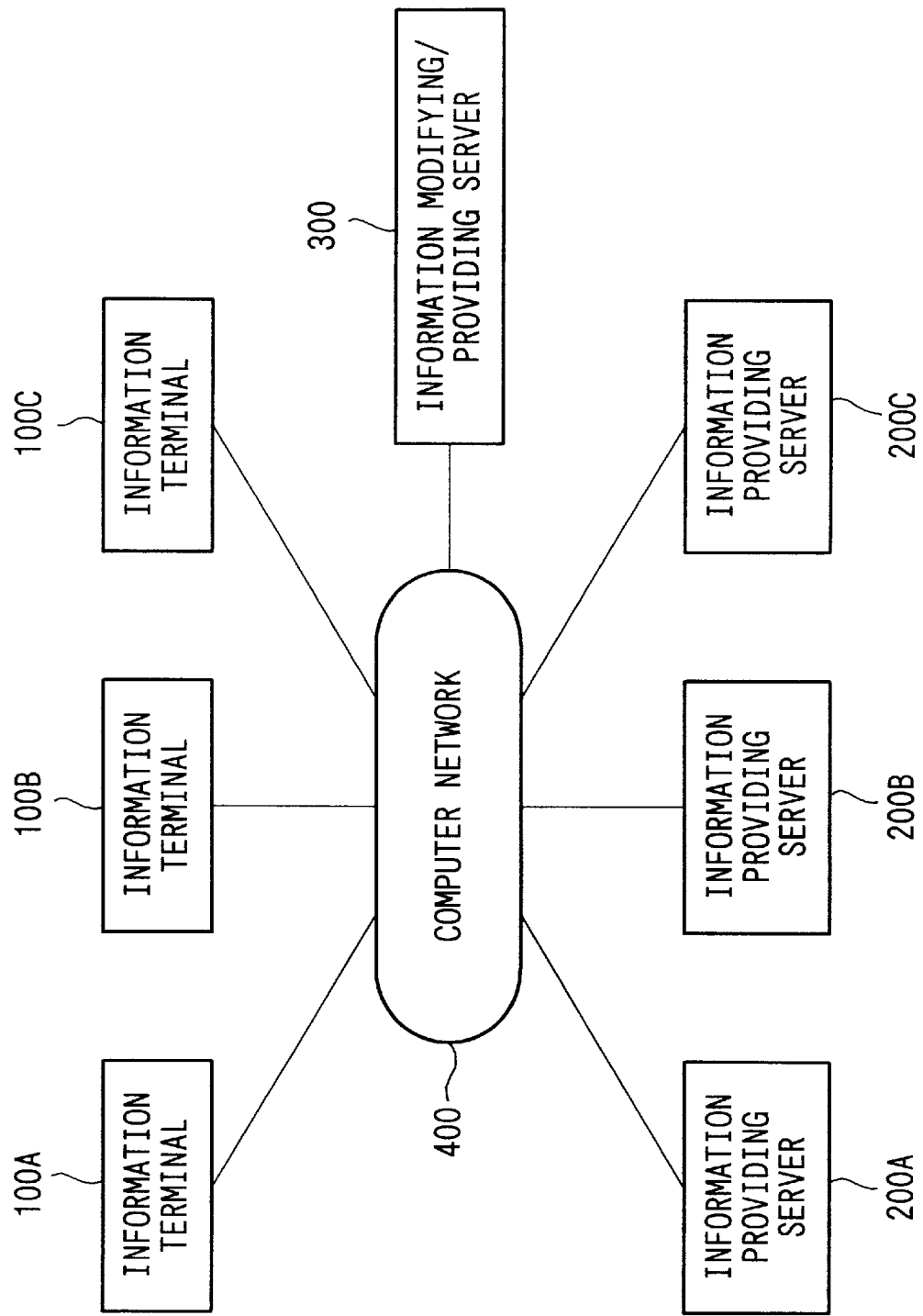
FIG. 1 is a block diagram showing the configuration of the information providing service system of the first embodiment according to the present invention.

FIG. 1 shows the configuration of the information providing service system as the first embodiment according to the present invention. The system shown in the figure consists of plural information terminals 100A, 100B, and 100C; plural information providing servers (abbreviated as simply "server", hereinbelow) 200A, 200B, and 200C; information modifying (or translating) and providing server 300; and computer network 400.

Figure 16:
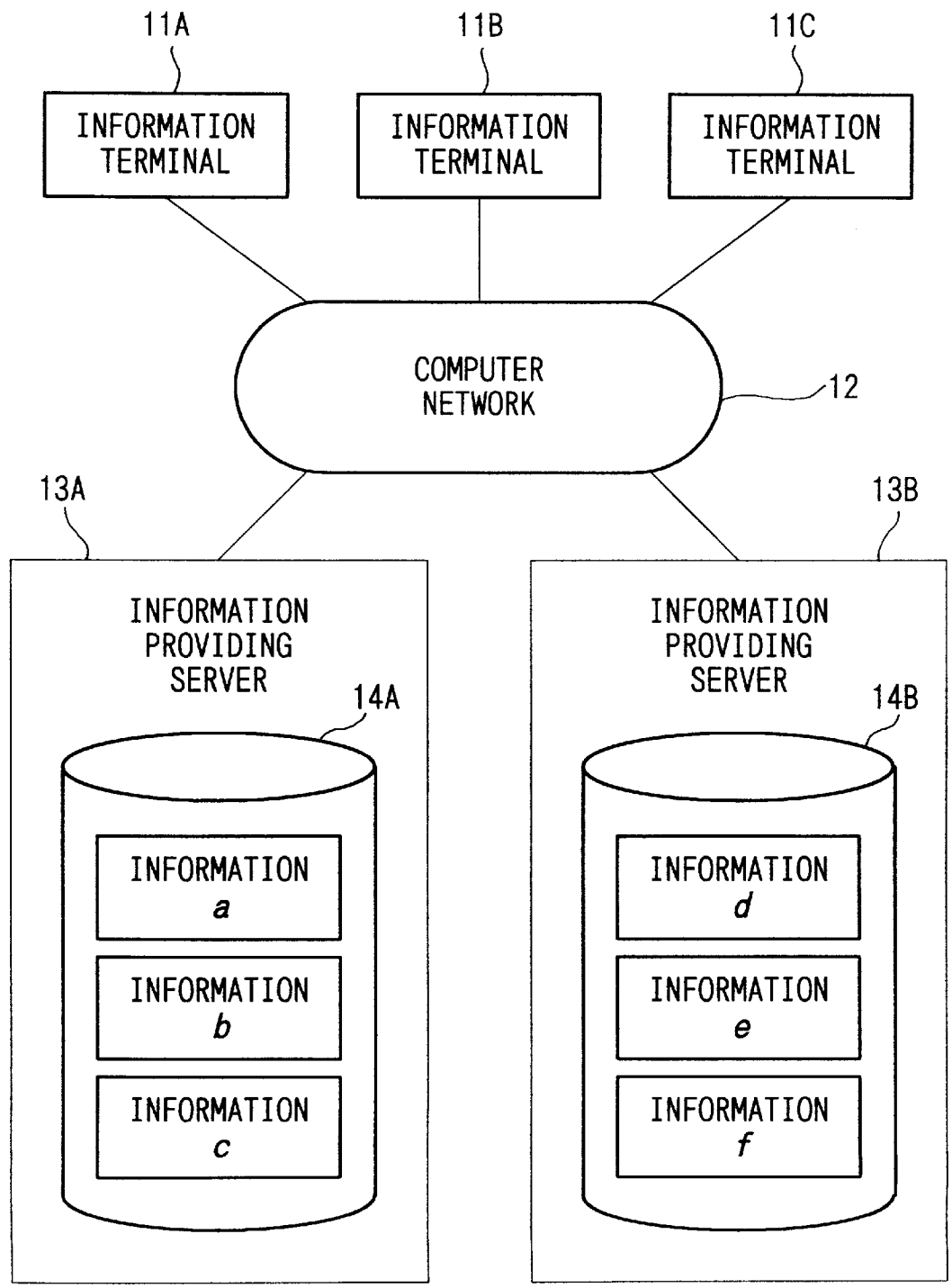
FIG. 16 is a block diagram showing a configuration of conventional systems.
Figure 17:
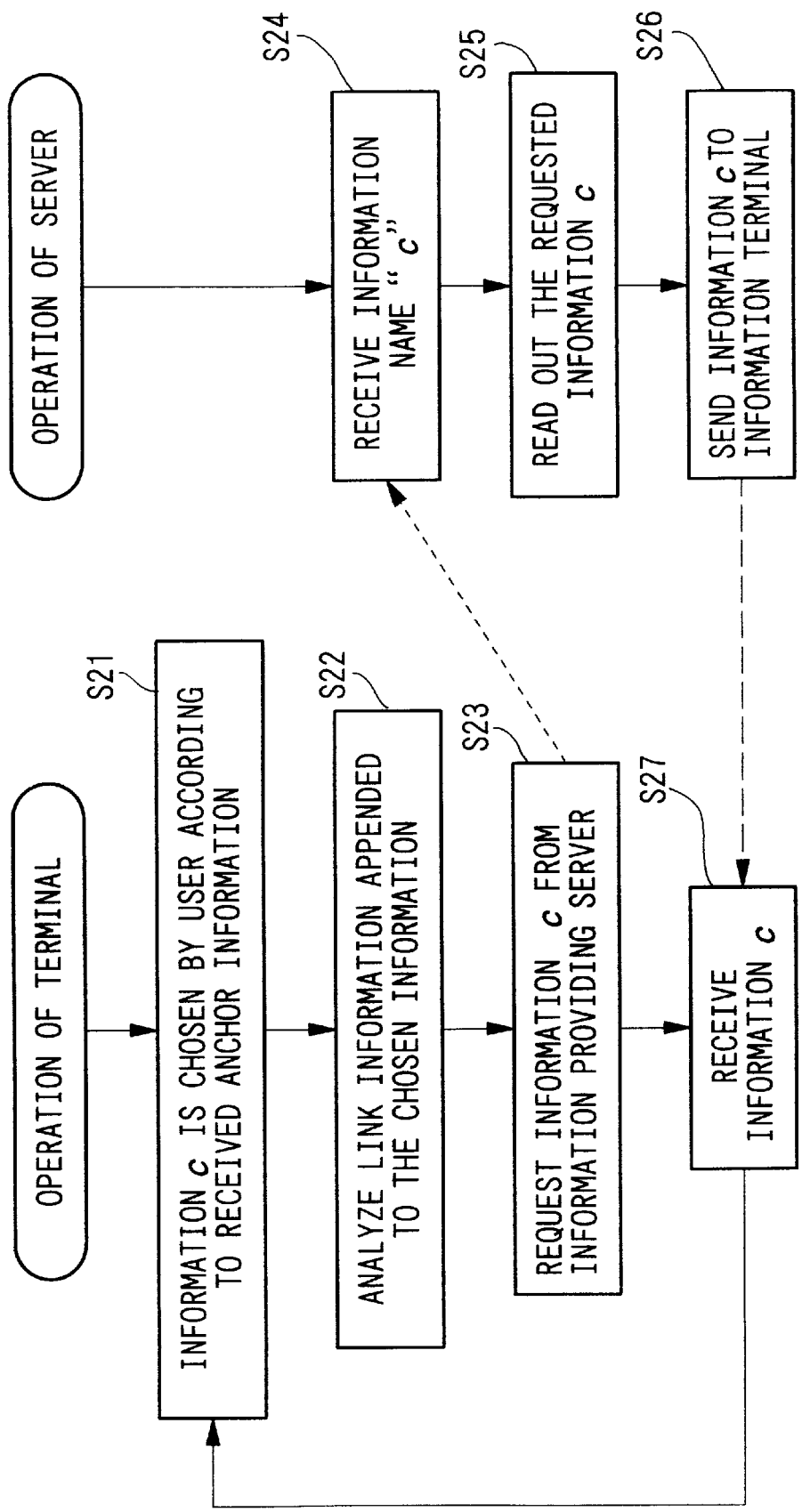
FIG. 17 is a sequence chart for explaining operations of a conventional method.
Figure 18:
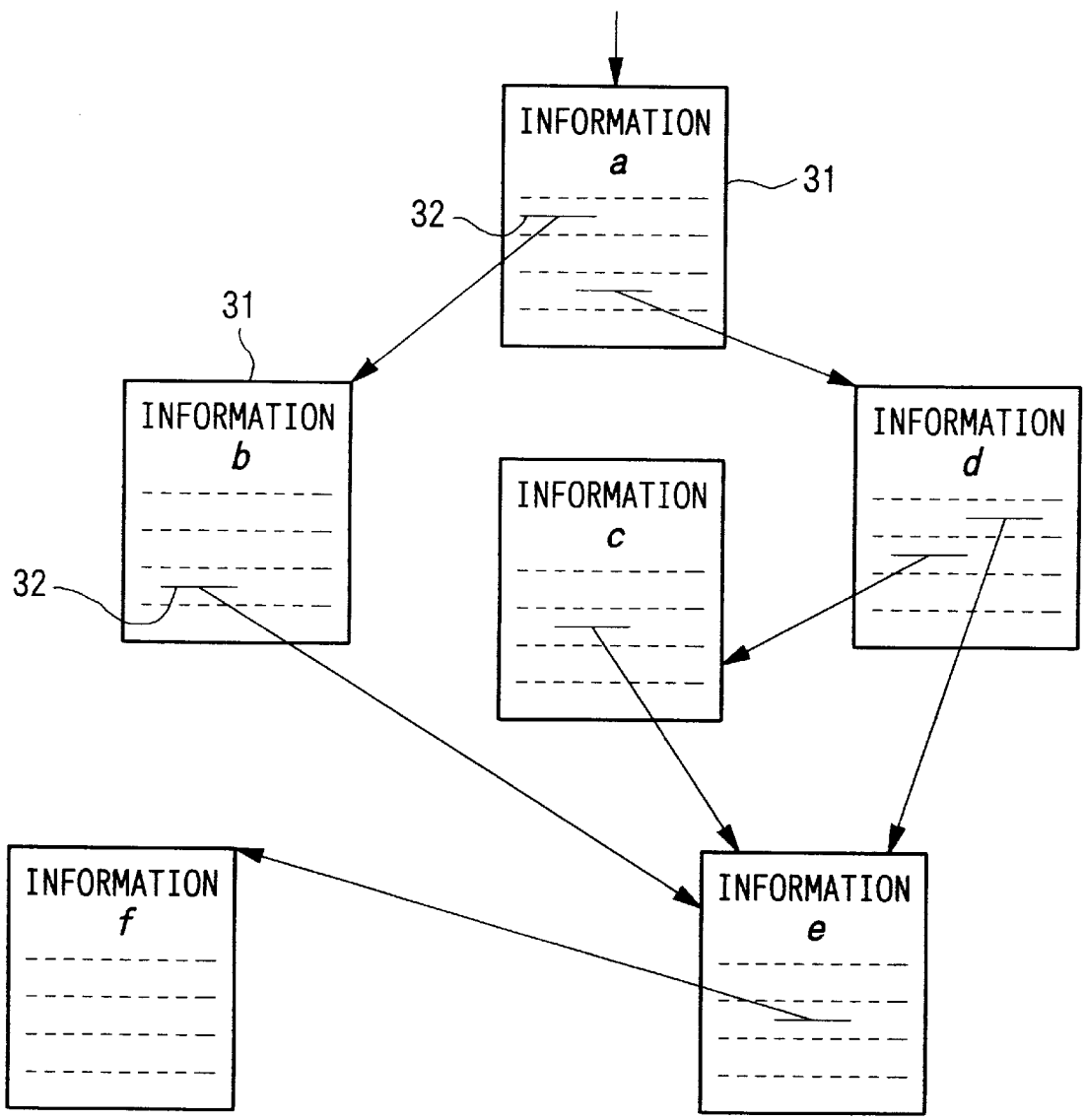
FIG. 18 is a diagram showing an transition state with respect to information which a user can acquire in the conventional method.

This configuration is made by adding information modifying and providing server 300 to the conventional system configuration shown in FIG. 16. In the figure of the present configuration, indication of an information storage device in each information providing server 200 is omitted. When request information which is sent from information terminal 100 to information modifying and providing server 300 includes modification information for modifying (or translating) information, the server 300 receives the modification information and acquires information provided by another server 200 based on the modification information, and adds a new link information item to the acquired information so as to send it to information terminal 100 which issued the information request.

Figure 2:
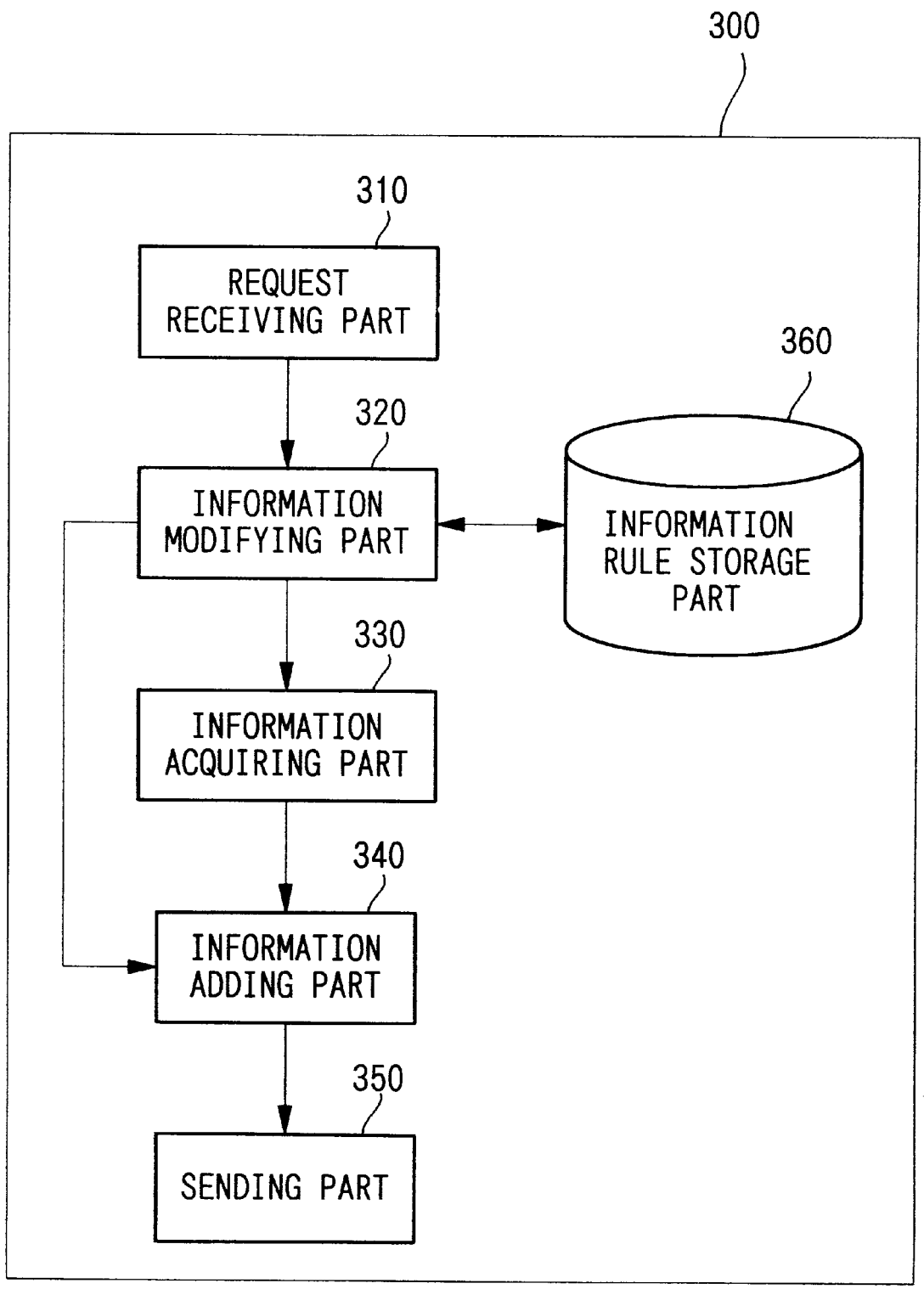
FIG. 2 is a block diagram showing the internal structure of the information modifying and providing server in the system.

FIG. 2 shows the internal structure of the information modifying and providing server of the present embodiment. The information modifying and providing server 300 consists of: request receiving part 310 for receiving request information sent from information terminal 100; information modifying part 320 for determining information to be provided to information terminal 100, and choosing server 200 as a provider of the determined information, based on the modification information included in the request information; information acquiring part 330 for acquiring information (necessary for information terminal 100) via computer network 400 from server 200 which maintains the information designated by information modifying part 320; information adding part 340 for adding data such as the modification information transferred from information modifying part 320 and the name of the information modifying and providing server to the information acquired by the information acquiring part 330; sending part 350 for sending information; and information modification rule storage part 360 for storing modification rules used at the time of performing information modification in the information modifying part 320.

In the above structure, information modifying part 320 searches information modification rule storage part 360 based on request information sent from information terminal 100, and if the request information agrees with a predetermined modification rule, another information corresponding to the information requested by information terminal 100 is acquired from server 200 as a provider of the other information, so as to transfer the acquired information to information adding part 340.

In the information modification rule storage part 360, information modification rules as shown in FIG. 3 are stored. The information modification rules have plural items such as a modification key, a server name, an information name, a modified server name (i.e., a server name after modification), and a modified information name (i.e., an information name after modification). The modification key is data indicating a user's characteristic, for example, classified data such as, an upper grade, a middle grade, etc., according to the understanding level with respect to a specified field of knowledge. Among these items, the modification key, the server name, and the information name are included in link information which is sent from server 200 to information terminal 100, and are then transferred by information terminal 100 to information modifying and providing server 300 as link information corresponding to relevant anchor information.

The information adding part 340 adds modification information (transferred from information modifying part 320) such as the modification key and the information modifying/providing server name to all link information items included in the information transferred from information acquiring part 330, and transfers the information after the addition to sending part 350.

FIGS. 4A–4C show format examples of information send and received between the information terminal, the (information providing) servers, and the information modifying and providing server of the present embodiment.

Format A as shown in FIG. 4A is a format of information (i.e., initial screen information) which is initially provided from a server (200) to information terminal 100, which consists of an information terminal name (as an identifier) of the destination, a server name (as an identifier) of the source, link information, anchor information, anchor-termination index (data) for indicating the end of anchor information, and data to be provided (i.e., provided data). The set of link information, anchor information, and anchor-termination index may be inserted anywhere in the provided data, as shown in the figure. The link information (which is not displayed on the screen) consists of data such as an information modifying/providing server name, a server name, a modification key, an information name, these data corresponding to anchor information included in the relevant information. If a user is going to receive information provided in this system at the first time, the user has never before accessed information modifying and providing server 300; thus, data items of the information modifying/providing server name and the modification key included in the link information are set to be unrelated values or are blank.

In addition, this format is also used when the information modifying and providing server 300 sends information to information terminal 100, as explained later.

Format B as shown in FIG. 4B is a format used when information terminal 100 issues an information provision request to information modifying and providing server 300. This format consists of a server name of the destination (that is, an identifier of information modifying and providing server 300), an information terminal name (that is, an identifier of the information terminal itself), and modification information. The modification information consists of a server name, a modification key, and an information name, these data being obtained, at the information terminal 100 side, from link information included in information of format A. Regarding the server name as a destination, if the relevant information of format A does not include data of the information modifying/providing server name and the modification key, the server name of the source of the information (of format A) is determined to be the server name as a destination, and information access is performed using a method similar to the conventional method.

Format C as shown in FIG. 4C is a format used when information modifying and providing server 300 issues an information provision request to server 200 which can provide information designated (or requested) according to the information of format B. This format consists of a "server name" for setting a name (identifier) of server 200 corresponding to the server name included in modification information in the format-B information, an "information modifying/providing server name" for assigning the name of the information modifying and providing server itself, and an "information name" for the provision request.

Figure 5:
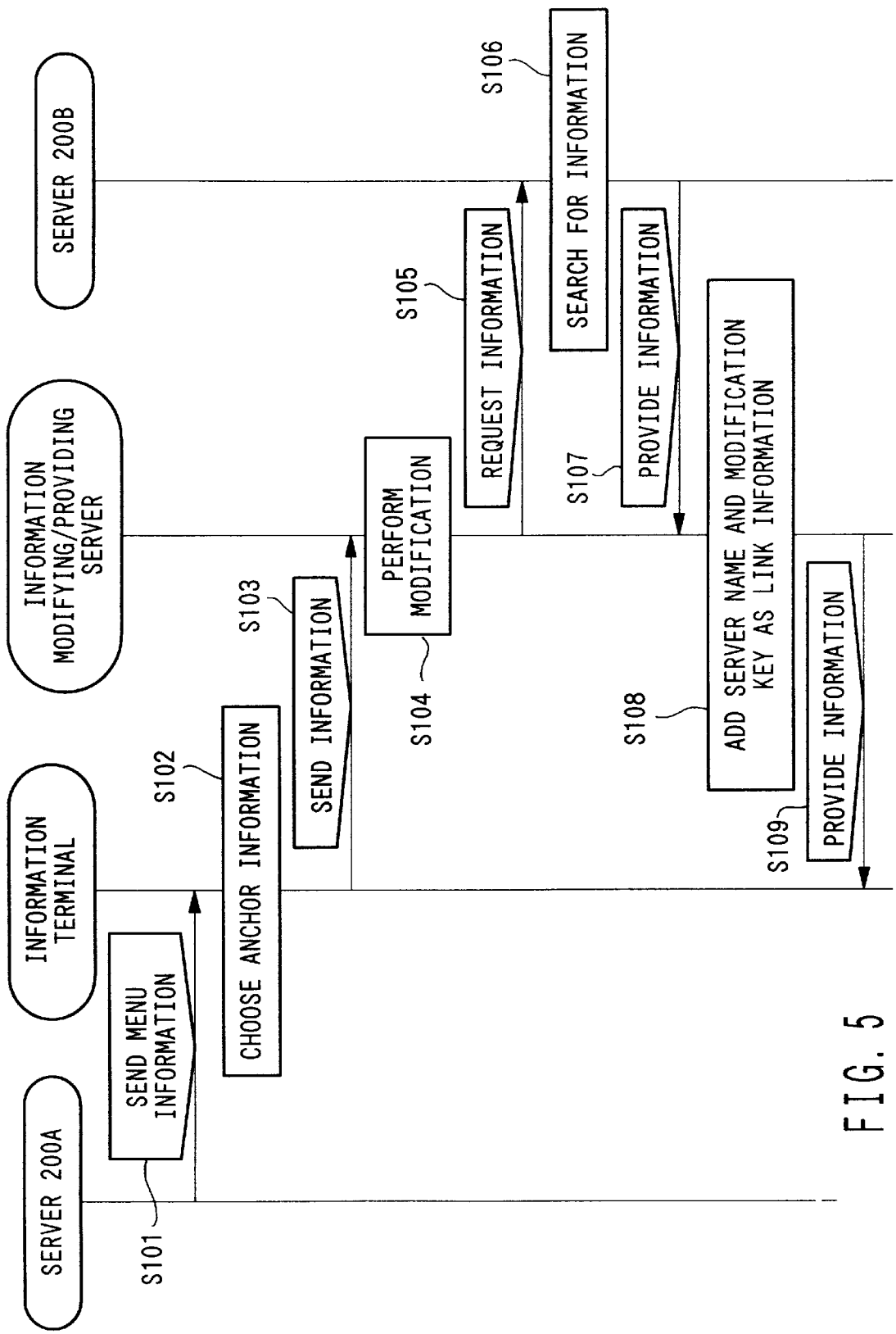
FIG. 5 is a sequence chart for explaining basic operations of the first embodiment.

A summary of operations performed in the above configuration will be explained below with reference to FIG. 5.

Step S101: Server 200A sends information A to information terminal 100 by using the format as shown in FIG. 4A. The information A is, for example, menu information which enables a user to choose an information item among information items shown on the screen.

Step S102: Information terminal 100 receives information A, and displays this information on the screen. If this information includes anchor information which indicates the presence of at least one another information item (a) relating to a part of information A, and link information including the information name of the other information (a) and the server name (B) which stores the other information (a), the user chooses an anchor information item from the information displayed on the screen.

Step S103: The information terminal 100 generates information B (of format B as shown in FIG. 4B) with respect to the link information corresponding to the anchor information, and transfers the generated information to information modifying and providing server 300. Here, as a server name as the destination of information B, the server name of information modifying and providing server 300 is designated, while as an information terminal name, the identifier of its own terminal is designated. Regarding the items for the modification information, according to the link information of information A obtained from server 200A, the name of the server which provides information corresponding to the anchor information, the modification key, and the relevant information name are designated.

Step S104: When the information modifying and providing server 300 receives information B from information terminal 100, the server 300 searches information modification rule storage part 360, based on the modification information included in the received information, to perform a modification process for obtaining a server name (which provides information corresponding to a request from information terminal 100) and a name of information to be provided.

Step S105: The information modifying and providing server 300 sends information C (of the format as shown in FIG. 4C) as an information provision request to server 200.

Step S106: The server 200 searches for information with respect to the provision request of information C.

Step S107: Server 200 transfers the read-out information to information modifying and providing server 300.

Step S108: The information modifying and providing server 300 arranges the received information to agree with the format as shown in FIG. 4A. Here, as to the information terminal name, the information terminal name of the destination (that is, the identifier of information terminal 100 which issued the information provision request) is assigned. As to the link information, data such as the server name of itself and the modification key are provided.

Step S109: The information modifying and providing server 300 sends the arranged information, which agrees with the format as shown in FIG. 4A, to information terminal 100.

In this way, when the information terminal sends only information for identifying another information relating to the present information shown on the screen to information modifying and providing server 300, the information terminal can automatically acquire information which agrees with the user's level of understanding or preference.

Hereinbelow, more concrete examples relating to the present embodiments will be explained. In the examples, it is assumed that an information terminal 100 is connected to computer network 400, and the server names of information providing servers 200A, 200B, and 200C are "A", "B", and "C", respectively, while the server name of information modifying and providing server 300 is "D".

FIG. 6 shows an example of the initial screen image displayed on the information terminal.

The initial screen image in the figure corresponds to information which (the user of) this terminal receives from server 200A in order to search for another information relating to the "Internet". Here, the parts indicated by underlines 501, 502, and 503 (displayed on the screen) are anchor information items which indicate presence of another information relating to each underlined part. Here, to each anchor information item, the following invisible link information items are appended at this stage.

(1) link information appended to the anchor information indicated by underline 501:
Server name "A"; Information name "a".

(2) link information appended to the anchor information indicated by underline 502:
Information modifying/providing server name "D";
Modification key "middle grade";
Server name "A"; Information name "f".

(3) link information appended to the anchor information indicated by underline 503:
Information modifying/providing server name "D";
Modification key "upper grade";
Server name "A"; Information name "d".

Here, when a user chooses the underlined part "first use", the identifier of information modifying and providing server 300 is not assigned in the relevant link information; thus, information is provided to the user with the procedure used by the conventional-type information providing system. For another anchor information item such as "have previously used" or "review only one point", the information modifying/providing server name, the modification key, the server name, and the information name are provided as link information.

Figure 7:
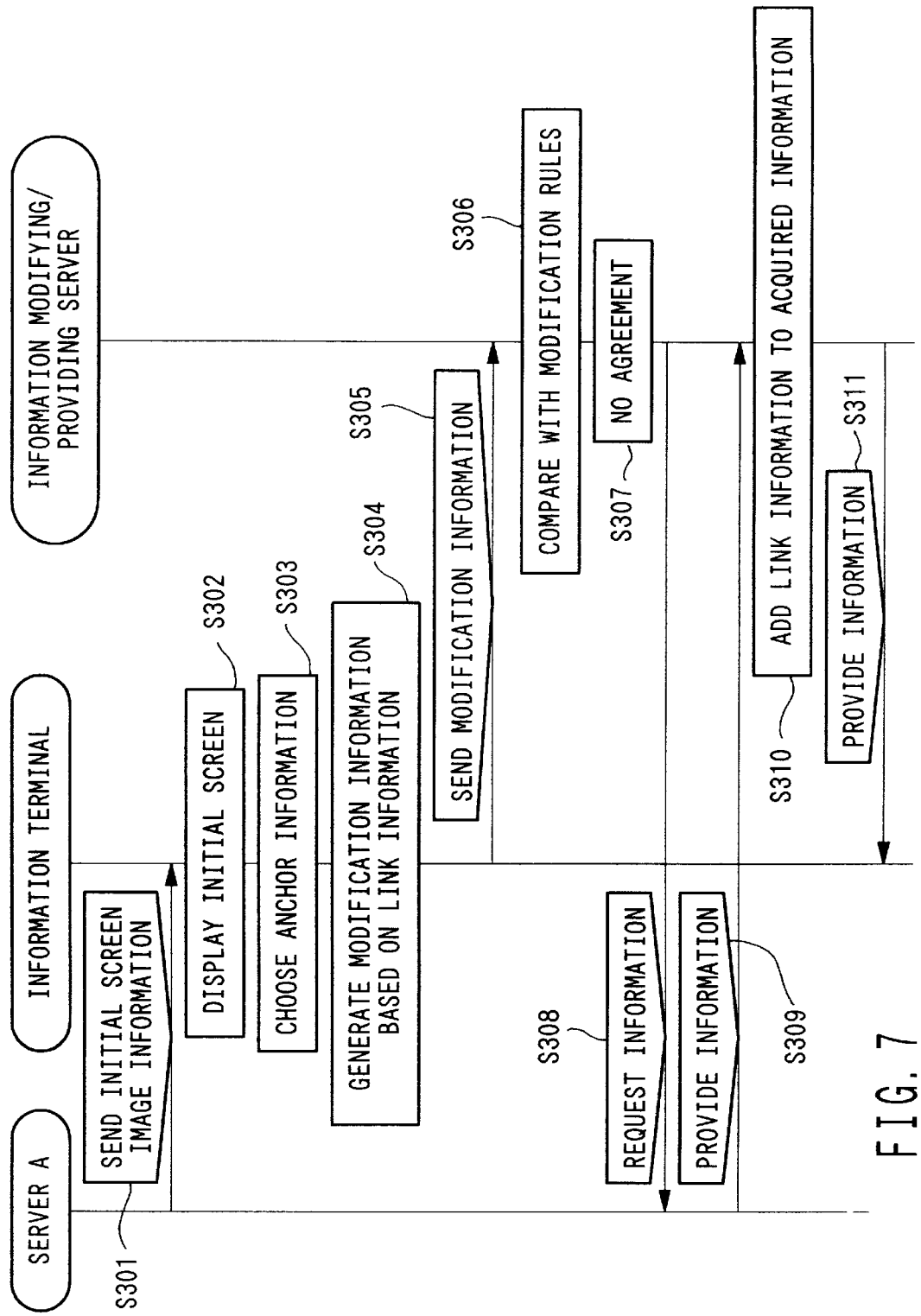
FIG. 7 is a sequence chart for explaining operations in the case in which modification is not performed in the first embodiment.

FIG. 7 is a sequence chart (of the first case) for explaining the operations of the concrete example.

Step S301: Information terminal 100 acquires initial-screen image information (as shown in FIG. 6) from server A.

Step S302: The information terminal 100 displays the initial screen image as shown in FIG. 6.

Step S303: Here, the user chooses anchor information "review only one point" according to the initial screen displayed.

Step S304: The information terminal 100 generates modification information (refer to FIG. 4B, modification key: upper grade; server name: A; information name: d) in accordance with link information (information modifying/providing server name: D; modification key: upper class; server name: A; information name: d) appended to the anchor information.

Step S305: The information terminal 100 sends the modification information generated in step S304 to information modifying and providing server 300 by using format B as shown in FIG. 4B.

Step S306: The request receiving part 310 in information modifying and providing server 300 receives the information including the modification information from information terminal 100, and the information modifying part 320 searches the information modification rule storage part 360 by using the modification information.

Step S307: If there is a modification rule which agrees with the modification information, the content of the modification information is modified. However, there is no such rule in the modification rules shown in FIG. 3; thus, no modification is performed. Therefore, according to original modification information sent from information terminal 100, server A which can provide information d is determined as a provider of information.

Step S308: The information acquiring part 330 requests server A as the destination to provide information d by sending information based on format C as shown in FIG. 4C.

Step S309: In this way, server A searches information d, and sends the information to information modifying and providing server 300.

Step S310: When information modifying and providing server 300 obtains information d, the information adding part 340 adds new link information items (information modifying/providing server name: D; modification key: upper grade) to information d. This addition of the user's level data to link information makes it possible that when the user chooses any anchor information item from information d the next time, upper-grade information can be accessed via information modifying and providing server 300.

Step S311: The sending part 350 in information modifying and providing server 300 sends information d to information terminal 100. Here, the "information name" is set to be "d" which is the name of the information requested by information terminal 100, and as to the link information, server name "D" of information modifying and providing server 300 and modification key "upper grade" are assigned.

That is, data items such as the information modifying/providing server name (D) and the modification key (upper grade) are appended to all link information items in information d which the user receives from information modifying and providing server 300; therefore, whenever the user chooses any anchor information next, the information provision request from the user is sent to information modifying and providing server 300.

Therefore, if no modification rule which agrees with the relevant modification information exists, it is possible to successively offer the user the information providing service via the information modifying and providing server. Accordingly, the present service can be continuously provided for the user even if modification rules relating to anchor information with respect to information d are not completely prepared, or if a new anchor information item is appended to information d.

Next, an example in which the same user chooses the underlined part "have previously used" (i.e., information f) in the initial screen information as shown in FIG. 6, and in which modification information of this case agrees with a modification rule, will be explained.

Figure 8:
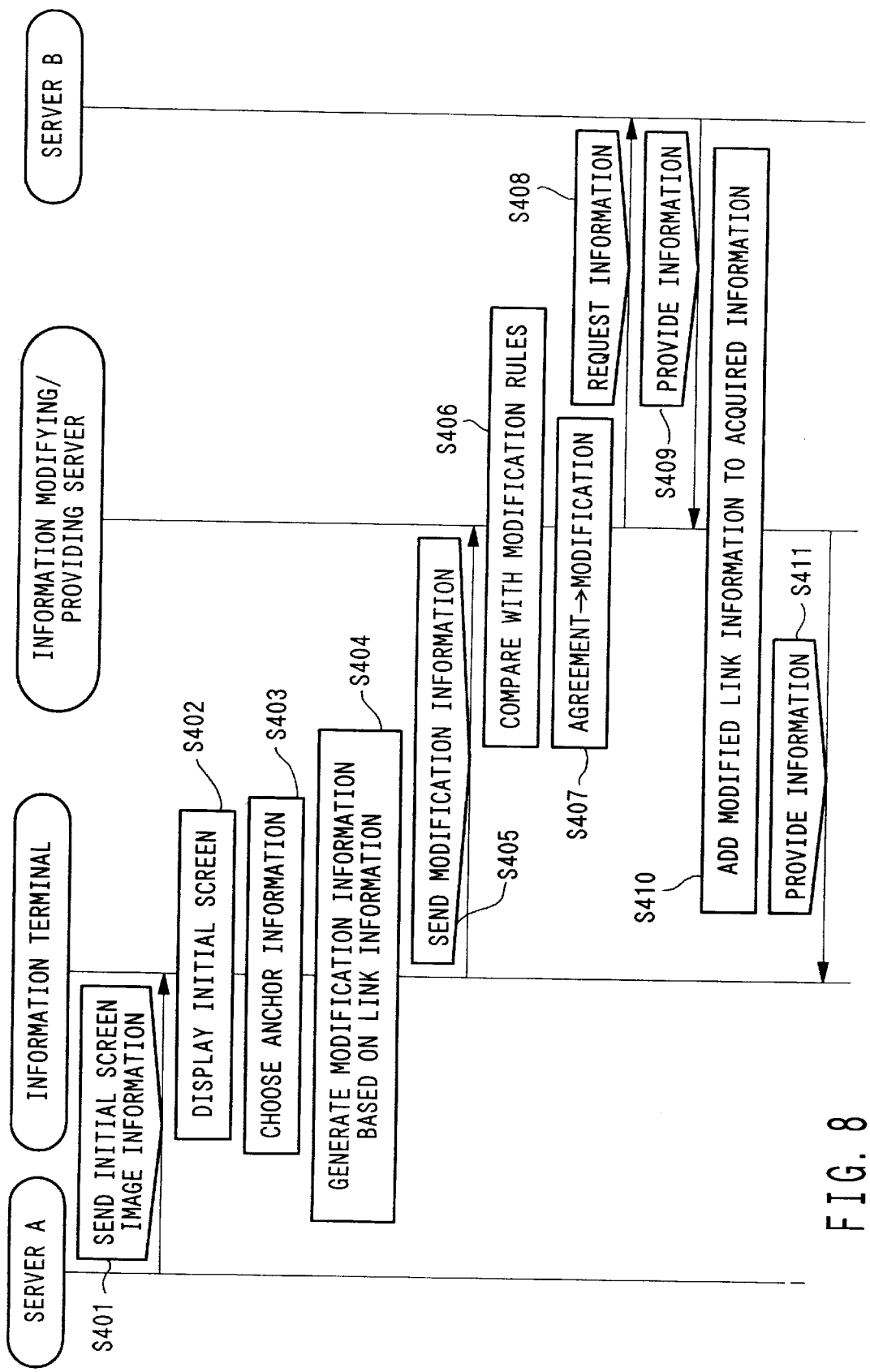
FIG. 8 is a sequence chart for explaining operations in the case in which modification is performed in the first embodiment.

FIG. 8 is a sequence chart for explaining (of the second case) for explaining the operations of the concrete example.

Step S401: Information terminal 100 acquires the initial-screen image information (as shown in FIG. 6) from server A.

Step S402: The information terminal 100 displays the initial screen image as shown in FIG. 6.

Step S403: Here, the user chooses anchor information "have previously used".

Step S404: The information terminal 100 generates modification information (refer to FIG. 4B, modification key: middle grade; server name: A; information name: f) in accordance with link information (information modifying and providing server name: D; modification key: middle class; server name: A; information name: f) appended to the chosen anchor information.

Step S405: The information terminal 100 sends request information including the modification information generated in step S404 to information modifying and providing server 300 by using format B as shown in FIG. 4B.

Step S406: The request receiving part 310 in information modifying and providing server 300 receives the request information from information terminal 100, and the information modifying part 320 searches the information modification rule storage part 360 by using the modification information (modification key: middle grade; server name: A; information name: f).

Step S407: Here, a modification rule which agrees with the modification information (modification key: middle grade; server name: A; information name: f) exists, such as: (modification key: middle grade; server name: A; information name: f; modified server name: B; modified information name: g). Therefore, modification is performed.

Step S408: When data (server name: B; information name: g) according to the modification is obtained, the information acquiring part 330 requests server B as the destination to provide information g by sending information based on format C as shown in FIG. 4C.

Step S409: In this way, server B sends information g to information modifying and providing server 300.

Step S410: When information modifying and providing server 300 obtains information g, the information adding part 340 adds new data (information modifying/providing server name: D; modification key: middle grade) to link information with respect to information g.

Step S411: The sending part 350 in information modifying and providing server 300 sends information g to information terminal 100.

Figure 9A:
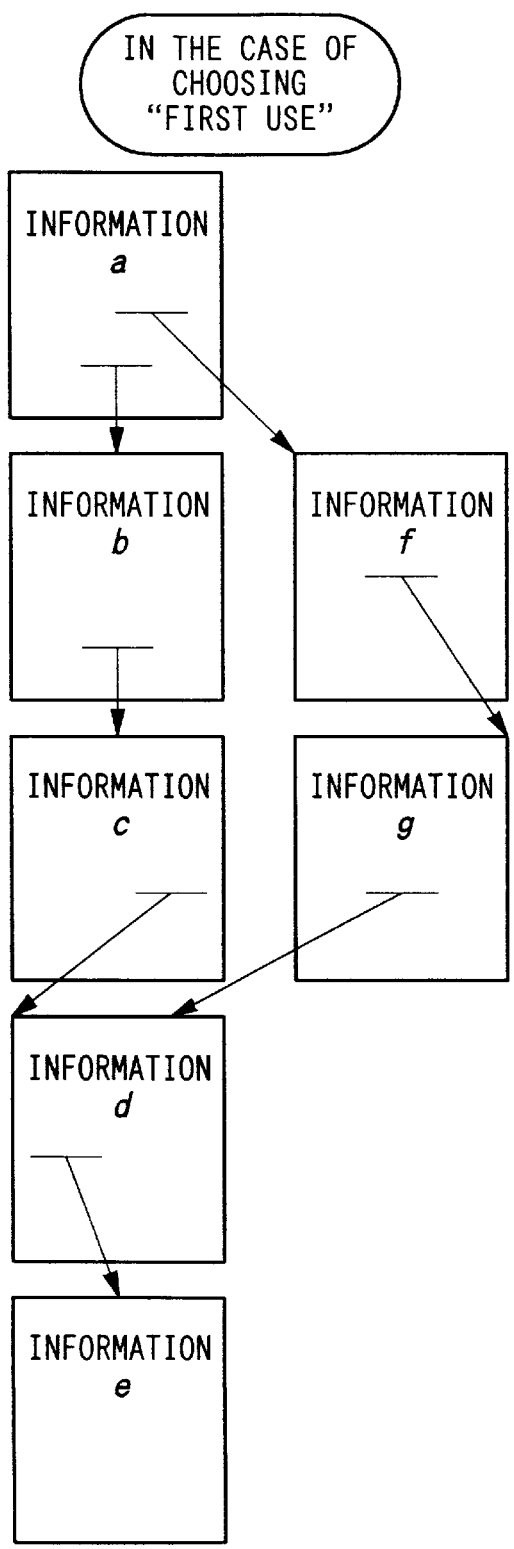
FIGS. 9A and 9B are diagrams for explaining a change of the information transition link route according to the first embodiment.
Figure 9B:
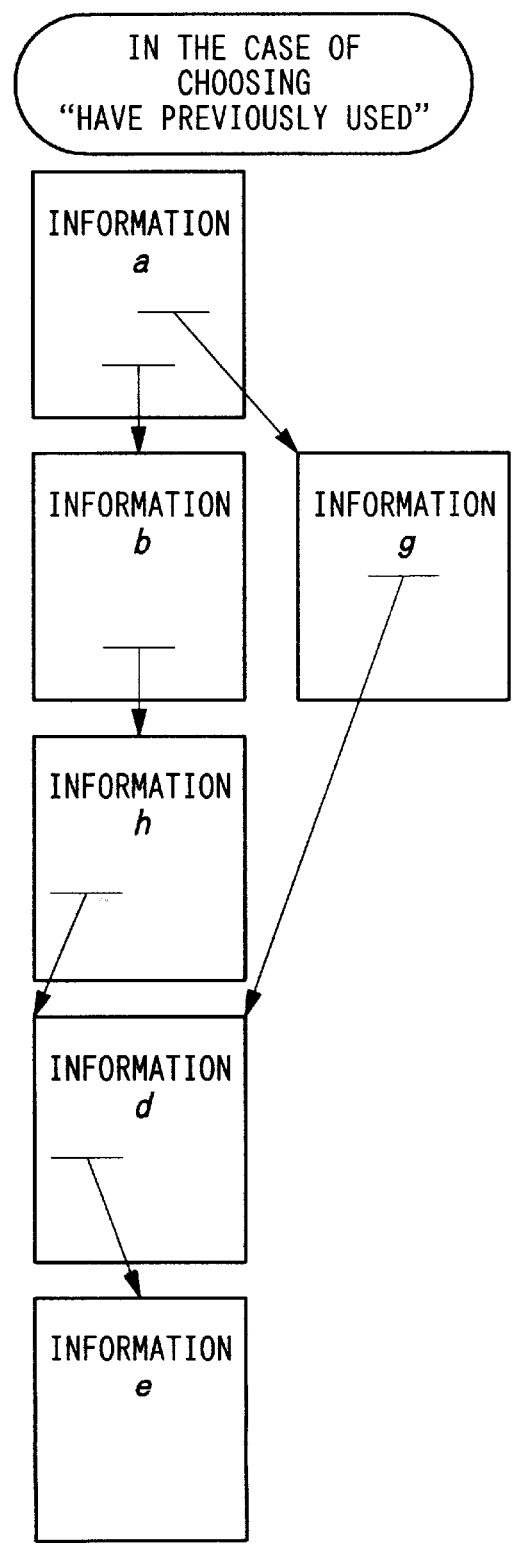

In this way, if it is assumed, for example, that in the link structure as shown in FIG. 9A, a beginner takes an information transition route "a→f→g→d→e", a user who chooses the anchor information "have previously used" takes another information transition route "a→g→d→e", where information f is skipped as shown in FIG. 9B, according to the modification rules as shown in FIG. 3. On the other hand, it is also possible to receive more professional information h instead of information c. That is, it is possible to rearrange an established link structure in accordance to the user's level, so as to establish an optimum link structure for the user.

Second Embodiment

This embodiment uses the same structure as the first embodiment, and performs a further additional control after the information modifying and providing server acquires information to be provided to the information terminal.

Figure 10:
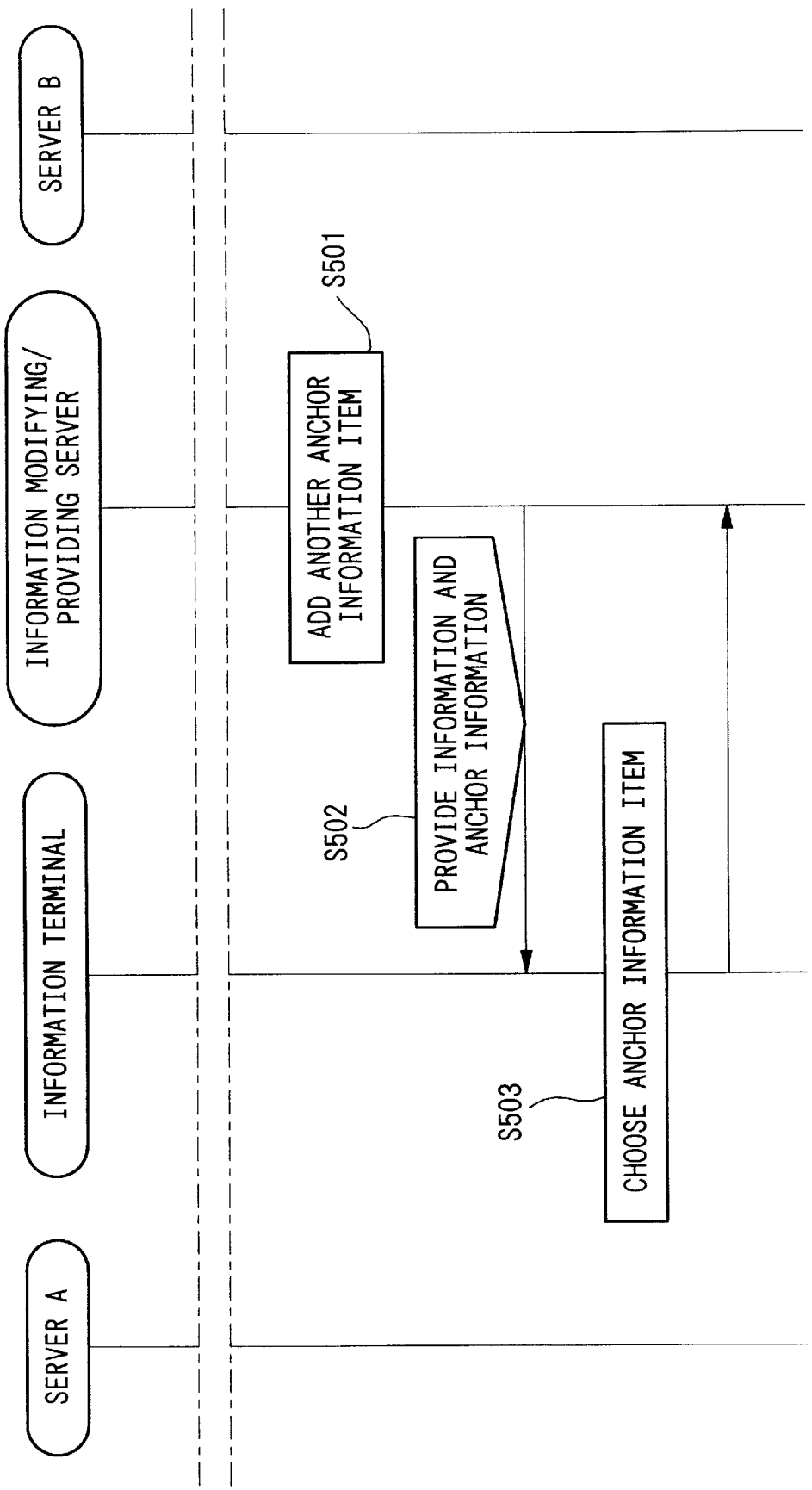
FIG. 10 is a sequence chart for explaining operations of the second embodiment.

FIG. 10 is a sequence chart for explaining the second embodiment. Here, the procedure up to the acquisition of information is the same as the first embodiment (that is, up to step S409 in FIG. 8); thus, an explanation thereof will be omitted. Here, information modification rules, as shown in FIG. 11, in which another item "anchor information" is added to the items in the information modification rules of the first embodiment (refer to FIG. 3), are used.

The following procedure will be explained bellow. Here, it is assumed that information g (modification key: middle class) after the modification process is sent from server 200B.

Step S501: If a character sequence which is assigned in the information modification rules as "anchor information" of the same middle grade (and which has not been assigned as anchor information yet) exists in the information transferred from server B, the information adding part 340 in the information modifying and providing server 300 additionally determines this character sequence as anchor information. Here, if information g contains character sequence "SMTP" of the same middle grade, this character sequence is additionally determined as a new anchor information item with respect to information g. In this case, by using format A as shown in FIG. 4A, the following data are assigned, such as: the information terminal name of the information provision request side as a destination; information modifying/providing server name "D" as the server name of the source; as link information 1, information modifying/providing server name "D"; modification key "middle class"; modified information name "h"; modified server name "B", and the corresponding anchor information "SMTP". The information of format A is then sent to information terminal 100. If there are plural anchor information items to be added, it is possible to further add necessary information by using items such as "link information 2, 3, . . . " as shown in FIG. 4A.

Step S502: The information modifying and providing server 300 transfers information g, to which new anchor information was added, to information terminal 100.

Step S503: Accordingly, if the user of information terminal 100 wants to get another information item, the user again chooses an anchor information item according to the provided screen information, whereby the above procedure is repeated.

On the other hand, if link information (relating to anchor information) in the information acquired by the information modifying and providing server includes any link information item corresponding to a grade other than the user's level, the link information item and the corresponding anchor information may be deleted. The judgment with respect to this deletion can be performed with reference to the modification rules as shown in FIG. 3 or 11. That is, for example, for a user of the middle grade, link information relating to the upper grade (i.e., server name: "A"; information name: "d") and the corresponding anchor information are deleted.

According to the above explanation in further operations, the user can acquire information which includes no link data unsuitable for the user's (learning) grade, but includes more link data suitable for the user's level than the former link data.

Third Embodiment

Figure 12:
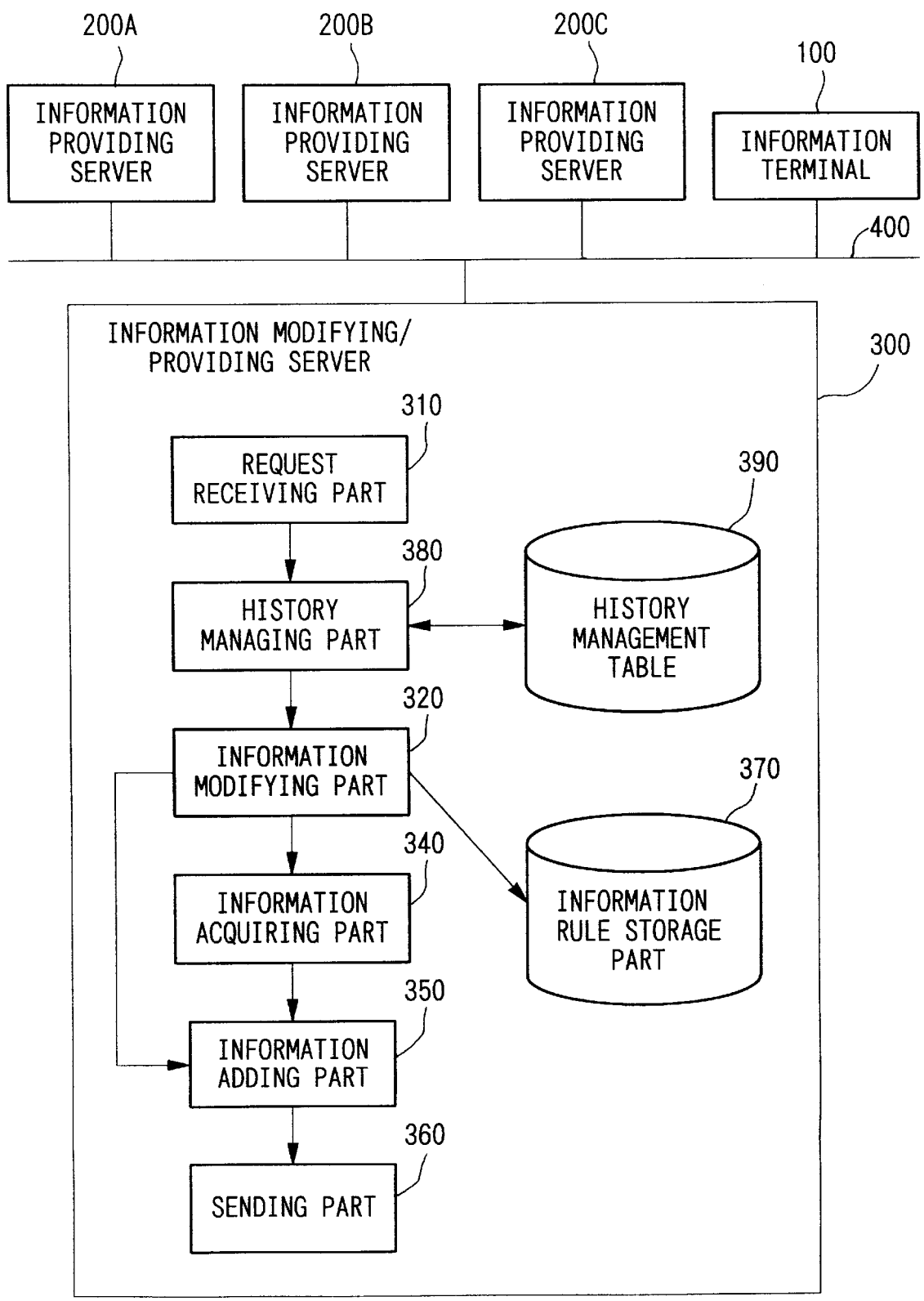
FIG. 12 is a block diagram showing the configuration of the information providing service system of the third embodiment according to the present invention.

FIG. 12 shows the configuration of the information providing system of the third embodiment according to the present invention. In the case of this configuration, history managing part 380 and history management table 390 are added to the structure of information modifying and providing server 300 in the configuration of the information providing system as shown in FIGS. 1 and 2.

FIG. 13 shows an initial screen image provided in the third embodiment. In the figure, the part surrounded by dashed lines indicates a field in which a user can input information data. The information input into this field can be sent to information modifying and providing server 300, as user's personal information and as a part of link information.

If a user inputs her name "Hanako Musashino", as shown in FIG. 13, link information such as "user: Hanako Musashino; server name: A; information name: a" is sent to information modifying and providing server 300.

In the information modifying and providing server 300, request receiving part 310 receives the information, and history managing part 380 searches history management table 390 so as to judge whether "user: Hanako Musashino" exists in the table. When a user first accesses the information modifying and providing server 300, the user is newly registered as a beginner in history management table 390.

FIG. 14 shows an example of the history management table in which "user: Hanako Musashino" was newly registered with "learning level: beginner's grade".

Next, information modifying part 320 searches information modification rule storage part 360 with the learning level (obtained by the history managing part 380) as a modification key. Here, if it is assumed that data "modification key: beginner's level; server name: A; information name: a" do not agree with any modification rule, no modification is performed. The information acquiring part 330 thus acquires information a from server 200A, and information adding part 340 adds data such as "information modifying/providing server name: D; user: Hanako Musashino" to link information of information a. The sending part 350 then sends information a to information terminal 100.

Accordingly, in link information items with respect to all anchor information items in the information a which this user secondly received, data such as "information modifying/providing server name: D; user: Hanako Musashino" are included. Therefore, if the user next chooses any anchor information item, the request information is always sent to information modifying and providing server "D".

If the user chooses information x (relevant server name: X), user's personal information data such as "user: Hanako Musashino; server name: X; information name: x" are sent to information modifying and providing server 300, and history information is updated while information is provided to information terminal 100 by performing the above same operations. The history managing part judges a learning level suitable for the user, based on predetermined judgment rules. After history information has been repeatedly updated and the history managing part has judged that the user's learning level has reached the middle grade, the learning level is automatically converted to the middle grade. After that, information modifying part 320 performs the search of the information modification rules with the modification key of "middle grade", whereby information suitable for a user of the middle grade is sent to the user.

As described above, the information modifying and providing server can automatically send information suitable for a user by using history information.

That is, according to the present embodiment, it is possible to automatically change the user's learning level based on the history information of the user; thus, more efficient and suitable link-transition can be provided for the user.

In addition, only names of information items which each user acquires are used in the history management table 390 in the present embodiment; however, another information such as a time taken for a user to acquire next information, or a (user's) score obtained by an exercise may also be used.

Furthermore, it is also possible that if a user is going to send a keyword, which corresponds to a concept of the user's demand, to a server which uses a search service called a "search engine", a search result suitable for the user can be provided by using a way in which the information modifying and providing server adds data relating to knowledge or interest of the user, which have been assumed according to the history information, to the keyword, and sends it to the search server.

The present invention is not limited by the above-explained embodiments, but various modified arrangements or various applications are possible within the scope of the claimed invention.

For example, the information modification rules may be revised in accordance with a state of server 200, or adaptability of the user of the information terminal.

In addition, another application for providing wider and more suitable information may be realized by providing plural information modifying and providing servers and making a set of information modification rules in each server to be used in common.

Figure 15:
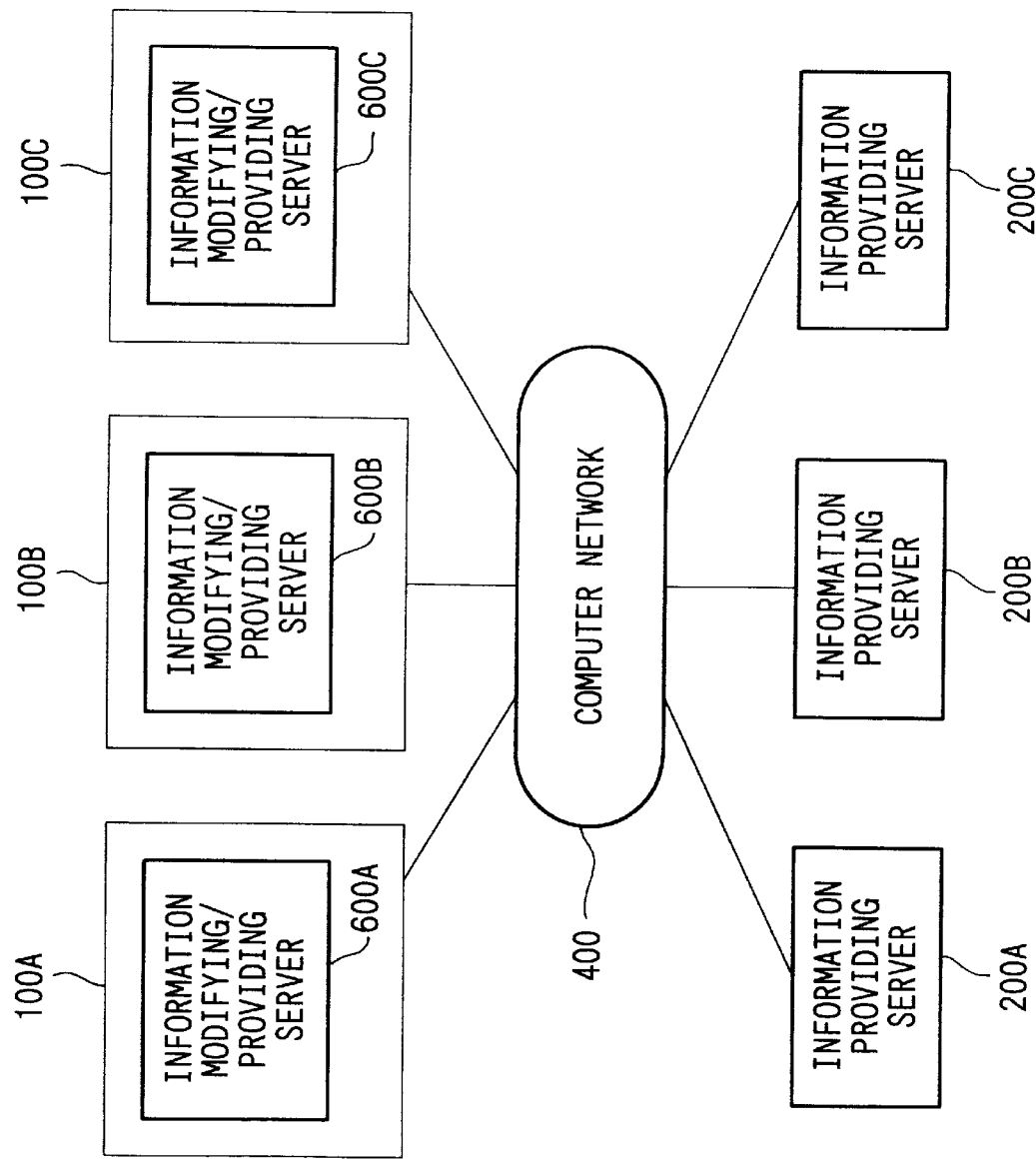
FIG. 15 is a block diagram showing an arrangement in which the information modifying and providing server according to the present invention is provided in each information terminal.

On the other hand, as shown in FIG. 15, another arrangement may be used, in which information modifying and providing servers (or server units) 600A, 600B, and 600C which function as the above information modifying and providing server are provided and a set of information modification rules for each user is prepared and stored in each server. In this case, only information modification rules suitable for the relevant user are stored in each information modifying and providing server 600; thus, most suitable information can be provided for the user without, also in this case, any special operations at the user side.

What is claimed is:

1. An information providing method used in a system in which at least one server and at least one information terminal are connected to a network, and when one of said at least one information terminal requests information provision, information is provided from one of said at least one server which stores the information, the information providing method comprising the steps of:

preparing information modification rules in which plural classes indicating characteristics of users are determined; then, regarding at least one information item, identification information with respect to the information item and one of said at least one server which stores the information item is assigned to one of the classes; a more suitable information item is determined as a modified information item with respect to the assigned information item, the modified information item being used when the assigned information item is chosen by a user who belongs to the relevant class; and identification information with respect to the modified information item and one of said at least one server which stores the modified information item are registered;

providing an information modifying and providing server which performs information provision control with reference to the modification rules; and in the information modifying and providing server,
when a first server of said at least one server provides a first information item to one of said at least one information terminal and the information terminal request a second information item relating to the first information item, judging whether or not the modified information item with respect to the second information item exists in the information modification rules;

if the modified information item does not exist, sending an information request to one of said at least one server which stores the second information item to send back the second information item to the information modifying and providing server;

if the modified information item exists, sending an information request to one of at least one server which stores the modified information item to send back the modified information item to the information modifying and providing server; and providing the sent-back information item to the information terminal which requested information.

2. An information providing method as claimed in claim 1, wherein when the information modifying and providing server sends the information request to the server which stores the relevant information item, link information for making the server send back the information item to the information modifying and providing server is added to the request.

3. An information providing method as claimed in claim 1, wherein when the information modifying and providing server provides the information item to the information terminal, link information for establishing a condition in which, when the information terminal next requests information, the request is issued via the information modifying and providing server, is added to the information item.

4. An information providing method as claimed in claim 1, wherein when the information modifying and providing server provides the information item to the information terminal, link information including identification information with respect to the relevant class is added to the information item.

5. An information providing method as claimed in claim 1, wherein access history information with respect to information access of the information terminal are stored, and link information to be appended to the information item which is provided to the information terminal is generated according to the access history information.

6. An information providing method as claimed in claim 1, wherein:
an anchor information item is related to each modified information item assigned in the modification rules;
if the modified information item exists and the information item sent back from the server which stores the modified information item includes a character sequence corresponding to the anchor information item with respect to another modified information item belonging to the same class, identification information with respect to the anchor information item, the other modified information item, and the corresponding server is added as link information to the sent-back information item so as to assign the character sequence as a new anchor information item with respect to the sent-back information item.

7. An information providing method as claimed in claim 1, wherein if the information item sent back to the information modifying and providing server includes link information belonging to another class in the modification rules, the link information and anchor information corresponding to the link information are deleted.

8. An information providing method as claimed in claim 1, wherein the network is the Internet having the WWW function.

9. A storage medium storing a computer program for making a computer execute one of the methods claimed in claims 1–7.

10. An information providing system in which at least one server and at least one information terminal are connected to a network, comprising:
memory means for storing information modification rules in which plural classes indicating characteristics of users are determined; then, regarding at least one information item, identification information with respect to the information item and one of said at least one server which stores the information item is assigned to one of the classes; a more suitable information item is determined as a modified information item with respect to the assigned information item, the modified information item being used when the assigned information item is chosen by a user who belongs to the relevant class; and identification information with respect to the modified information item and one of said at least one server which stores the modified information item are registered; and an information modifying and providing server which performs information provision control with reference to the modification rules stored in the memory means, and the information modifying and providing server comprising:
request receiving means for receiving an information request from one of said at least one information terminal, said request being issued when a first server of said at least one server provides a first information item to the information terminal, and said request having a demand for a second information item relating to the first information item;

judging means for judging whether or not the modified information item with respect to the second information item exists in the information modification rules;

information acquiring means for sending an information request to one of said at least one server which stores the second information item to acquire the second information item if the modified information item does not exist, and for sending an information request to one of said at least one server which stores the modified information item to acquire the modified information item if the modified information item exists; and sending means for providing the information item acquired by the information acquiring means to the information terminal which requested information.

11. An information providing system as claimed in claim 10, wherein the information modifying and providing server further comprises information adding means for adding new link information to the information item acquired by the information acquiring means.

12. An information providing system as claimed in claim 11, wherein the new link information includes information for establishing a condition in which when the information terminal next requests information, the request is issued via the information modifying and providing server.

13. An information providing system as claimed in claim 11, wherein the new link information includes identification information with respect to the relevant class.

14. An information providing system as claimed in claim 11, wherein:

the memory means further stores an anchor information item which is related to each modified information item assigned in the modification rules; and if the modified information item exists and the information item acquired by the information acquiring means includes a character sequence corresponding to the anchor information item with respect to another modified information item belonging to the same class, the information adding means includes identification information with respect to the anchor information item, the other modified information item, and the corresponding server into the new link information so as to assign the character sequence as a new anchor information item with respect to the information item acquired by the information acquiring means.

15. An information providing system as claimed in claim 10, further comprising history managing means for managing access history information with respect to access history of the information terminal to the request receiving means.

16. An information providing system as claimed in claim 15, wherein the access history information includes a user name, a learning level, and a name of information which the user acquired in the past.

17. An information providing system as claimed in claim 15, wherein the access history information includes a user name, a learning level, and a time taken for the user to acquire another next information item.

18. An information providing system as claimed in claim 15, wherein the access history information includes a user name, a learning level, and a score information of the user.

19. An information providing system as claimed in claim 15, further comprising class revising means for revising, based on the access history information, the class to which the user of the information terminal belongs.

20. An information providing system as claimed in claim 19, wherein:

the access history information includes a learning level of the user, and if the class receiving means judges, with reference to the access history information, that the learning level of the user reached a predetermined level or more, the class revising means updates the learning level of the user in the access history information.

21. An information providing system as claimed in claim 10, further comprising means for changing the content of the information modification rules according to improvement of a user's level.

22. An information providing system as claimed in claim 10, further comprising means for changing the content of the information modification rules according to change of the content of said at least one server which provides information.

23. An information providing system as claimed in claim 10, wherein the information modifying and providing server is provided in each information terminal, and the memory means in each information modifying and providing server stores information modification rules with respect to the relevant information terminal.

24. An information providing system as claimed in claim 10, wherein the network is the Internet having the WWW function.

* * * * *